R. S. LEWIS & J. H. MOORE.
SETTLING TANK.
APPLICATION FILED JULY 23, 1910.
973,357.
Patented Oct. 18, 1910.
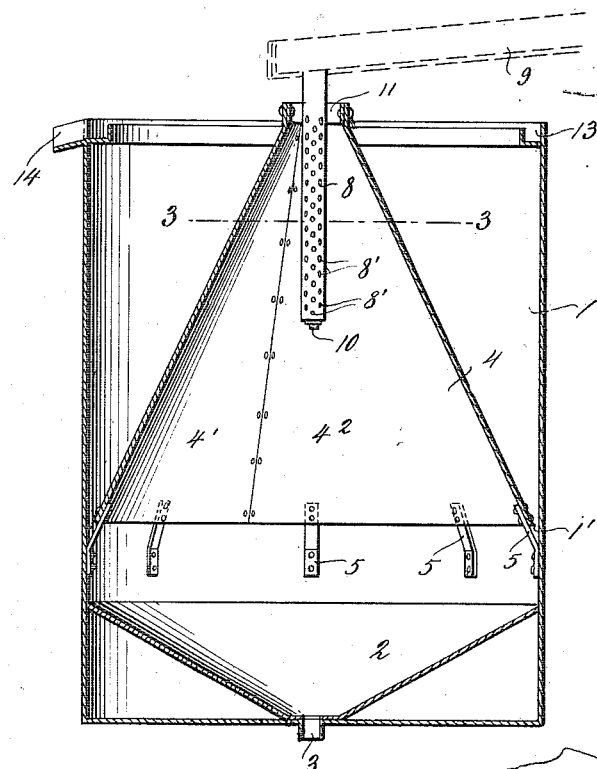
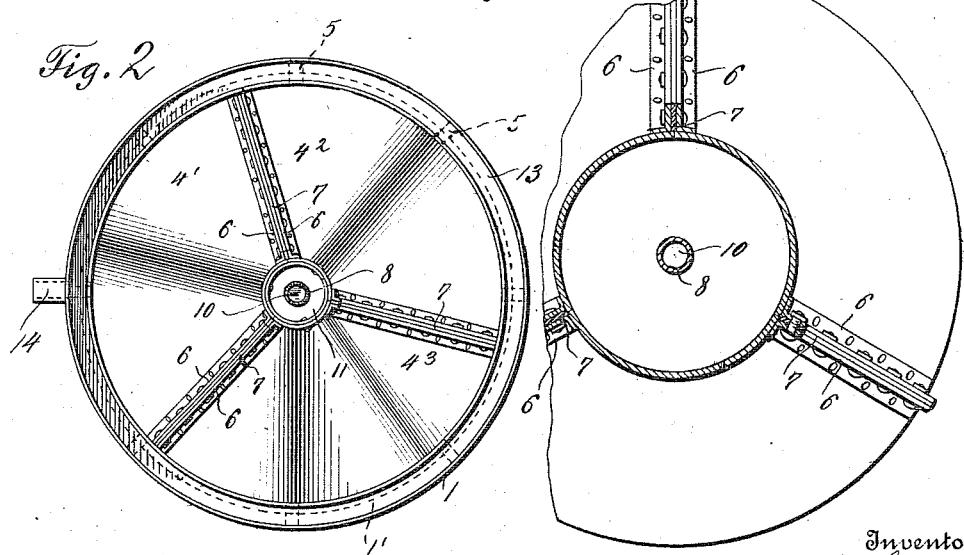

UNITED STATES PATENT OFFICE.

ROBERT S. LEWIS AND JOHN HENRY MOORE, OF McGILL, NEVADA.

SETTLING-TANK.

973,357.   Specification of Letters Patent.   Patented Oct. 18, 1910.

Application filed July 23, 1910. Serial No. 573,582.

*To all whom it may concern:*

Be it known that we, ROBERT S. LEWIS and JOHN HENRY MOORE, citizens of the United States, residing at McGill, in the county of White Pine and State of Nevada, have invented certain new and useful Improvements in Settling-Tanks, of which the following is a specification.

This invention consists of an improved form of tank of the class used in milling and designed to facilitate the settling of slimes in water.

The invention comprises essentially a peculiar arrangement of tank, an internal distributer, and deflector means whereby the entering water containing slimes is caused to flow downwardly from the top with ever decreasing velocity, and thence upwardly to a suitable overflow launder as practically clear water, the slimes settling at the bottom of the tank in the customary manner.

For a full understanding of the present invention reference is to be had to the following detailed description and to the accompanying drawing, in which—

Figure 1 is a vertical sectional view of a settling tank embodying the essential features of the present invention; Fig. 2 is a plan view; and Fig. 3 is a detailed section about on the line 3—3 of Fig. 1.

Throughout the following description and in the several figures of the drawing similar parts are referred to by like reference characters.

Referring to the specific construction of the invention as illustrated in the drawing, 1 denotes the tank or main receptacle provided at its lower portion with a deflector or bottom 2 shaped somewhat like an inverted cone and having upwardly and outwardly flaring side portions as shown clearly in Fig. 1. The central portion of the deflector 2 is provided with an outlet 3 through which the slimes may be drawn off from the tank in a manner readily apparent.

Above the deflector 2 is disposed a distributer 4 consisting of a hollow frusto-conical body supported in spaced relation to the deflector 2 by means of a plurality of brackets 5 secured at opposite ends to the distributer and sides of the tank 1. The distributer is centrally arranged in the tank 1 and its lower end terminates a very short distance from the side portions of the tank allowing slight clearance spaces shown at 1'. The diameter of the distributer is slightly less than that of the largest portion of the deflector 2, and the body of the distributer is preferably made in a plurality of sections shown at $4'$, $4^2$, $4^3$, in Fig. 2, said sections being united by means of angle irons 6 riveted or otherwise secured to their adjacent edges, suitable fastenings passing through the projecting flanges of the angle irons and connecting the same together. Suitable packing strips 7 are interposed between the connected angle irons 6 to render the connection water tight. The sections of the distributer 4 terminate at their upper ends in spaced relation to an inflow pipe 8, the latter extending downwardly from a suitable supply trough or launder 9 shown in dotted lines in Fig. 1. The inflow pipe 8 is provided with a removable plug 10 at its lower end, said pipe being apertured throughout its length as shown at 8'. The form of the sections of the distributer provides the opening 11 at the upper end of its body, a collar being secured to the sections at this point. The inflow pipe 8 is arranged centrally with respect to the opening 11 passing downwardly therethrough to a point about central with respect to the upper and lower ends of the distributer.

At its upper end the tank 1 is provided with an annular launder 13 into which the clear water separated from the slimes is adapted to overflow and to pass off through a suitable spout 14.

It will be observed that water and slimes enter the inflow pipe 8 and escape in small streams through the many apertures of said pipe flowing downwardly from the pipe 8. The velocity of the water gradually decreases and the slimes settle to the bottom or deflector 2, the clear water passing upwardly through the clearance spaces 1' between the lower end of the distributer and the tank 1 and overflowing into the launder 13 in a manner readily apparent.

The invention is constructed so as to afford the best possible settling conditions for the slimes and by reason of the simplicity and desirable arrangement of the parts of the tank the efficiency of the same for the purpose for which it is designed, is greatly increased as compared with similar devices at present in use.

Having thus described our invention, what is claimed as new is:—

1. In combination, a settling tank, a deflector arranged at the bottom of said tank adapted to receive slimes settling therein, a distributer disposed centrally in the upper portion of the tank and consisting of a frusto-conical body extending from the top of the tank downwardly to a point a short distance from the deflector, said distributer having its lower end portion spaced from the tank to form a clearance space, an inflow pipe passing through the upper end of the distributer and extending downwardly therein and having apertures throughout its length, and a launder at the upper end of the tank.

2. In combination, a settling tank, a deflector of inverted cone shape provided at its lower end with a draw off outlet and having its sides terminating at its upper end in contact with the sides of the tank, a distributer arranged in the tank of hollow frusto-conical form, the upper end of the distributer being provided with an opening, a plurality of brackets connecting the lower end of the distributer with the sides of the tank and holding said lower end of the distributer slightly spaced from the tank and a short distance above the upper end of the deflector, an inflow pipe passing downwardly through the opening at the top of the distributer and terminating intermediate the ends of the latter, said pipe being provided with apertures throughout its length, and a removable plug at its lower end, a launder at the upper end of the tank, and means for supplying slimes water to the inflow pipe.

3. In combination, a settling tank, a deflector arranged at the bottom of said tank and consisting of a hollow body of inverted cone shape provided at its lower end with a draw off outlet, a hollow distributer arranged in the tank above the deflector and consisting of a hollow frusto-conical shaped body composed of a plurality of sections, angle irons secured to the longitudinal edges of the sections, packing strips interposed between said angle irons and fastenings connecting the angle irons to unite the sections of the distributer, the upper end of the distributer being provided with an opening, a collar secured to and reinforcing the upper end portion of the distributer, the lower end of the distributer being of less diameter than that of the deflector beneath the same and spaced from the latter, brackets attached to the distributer and the sides of the tank supporting the distributer in a position in which its lower end is spaced from the tank, an inflow pipe extending from a point above the distributer passing downwardly through the upper open end of the latter and terminating about central of the ends of said distributer, said pipe being apertured throughout its length, a removable plug at the lower end of said pipe, and a launder at the upper end of the tank.

In testimony whereof we affix our signatures in presence of two witnesses.

ROBERT S. LEWIS.
JOHN HENRY MOORE.

Witnesses:
G. R. MERRILL,
J. I. MILLER.